United States Patent
Larsson et al.

(10) Patent No.: US 9,649,925 B2
(45) Date of Patent: May 16, 2017

(54) VEHICLE DRIVE TRAIN CONTROL METHOD

(71) Applicant: VOLVO TRUCK CORPORATION, Göteborg (SE)

(72) Inventors: Lena Larsson, Västra Frölunda (SE); Alfred Skoglund, Torslanda (SE)

(73) Assignee: Volvo Construction Equipment AB, Eskilstuna (SE)

( * ) Notice: Subject to any disclaimer, the term of this patent is extended or adjusted under 35 U.S.C. 154(b) by 73 days.

(21) Appl. No.: 14/440,932

(22) PCT Filed: Nov. 9, 2012

(86) PCT No.: PCT/SE2012/000184
§ 371 (c)(1),
(2) Date: May 6, 2015

(87) PCT Pub. No.: WO2014/074032
PCT Pub. Date: May 15, 2014

(65) Prior Publication Data
US 2015/0283892 A1    Oct. 8, 2015

(51) Int. Cl.
*B60K 6/12* (2006.01)
*F16H 61/4026* (2010.01)
(Continued)

(52) U.S. Cl.
CPC .................. *B60K 6/12* (2013.01); *B60K 6/52* (2013.01); *B60K 17/356* (2013.01);
(Continued)

(58) Field of Classification Search
CPC .......... B60K 6/12; B60K 6/52; B60K 17/356; F16H 61/4026; B60W 2030/1809
See application file for complete search history.

(56) References Cited

U.S. PATENT DOCUMENTS

| | | | |
|---|---|---|---|
| 6,119,802 A | 9/2000 | Puett | |
| 7,549,499 B2 * | 6/2009 | Delaney | B60K 6/12 180/242 |

(Continued)

FOREIGN PATENT DOCUMENTS

| | | |
|---|---|---|
| DE | 4340735 A1 | 6/1994 |
| EP | 0505727 A1 | 9/1992 |

(Continued)

OTHER PUBLICATIONS

International Search Report (Aug. 8, 2013) for corresponding International App. PCT/SE2012/000184.

(Continued)

*Primary Examiner* — Kevin Hurley
*Assistant Examiner* — Marlon A Arce
(74) *Attorney, Agent, or Firm* — WRB-IP LLP

(57) ABSTRACT

A heavy road vehicle provided with a hybrid propulsion system includes a mechanical propulsion system and a hydraulic propulsion system. The mechanical propulsion system is connected to at least one traction wheel which is powered by an internal combustion engine via a mechanical drive train and a gearbox. The hydraulic propulsion system is connected to at least one other traction wheel including a hydraulic motor powered by a hydraulic pump unit. The hybrid propulsion unit further includes a control unit for at least controlling the hybrid propulsion unit, optionally also controlling the mechanical propulsion system. The hydraulic propulsion system further includes a pressure accumulator which is connected to the hydraulic motor in order to maintain a pressure in the hydraulic motor even if the hydraulic pump unit is switched off.

6 Claims, 2 Drawing Sheets

(51) Int. Cl.
*F16H 61/4096* (2010.01)
*B60K 17/356* (2006.01)
*B60K 6/52* (2007.10)
*B60W 30/18* (2012.01)

(52) U.S. Cl.
CPC ..... *F16H 61/4026* (2013.01); *F16H 61/4096* (2013.01); *B60W 2030/1809* (2013.01); *Y02T 10/6208* (2013.01); *Y02T 10/6265* (2013.01)

(56) References Cited

U.S. PATENT DOCUMENTS

| | | |
|---|---|---|
| 2006/0197375 A1 | 9/2006 | Delaney |
| 2011/0197574 A1 | 8/2011 | Prigent et al. |
| 2011/0197575 A1 | 8/2011 | Prigent et al. |

FOREIGN PATENT DOCUMENTS

| | | |
|---|---|---|
| EP | 1433648 A2 | 6/2004 |
| EP | 2131073 A1 | 12/2009 |
| WO | 2011133072 A1 | 10/2011 |

OTHER PUBLICATIONS

Supplementary European Search Report (Jun. 15, 2016) for corresponding European App. EP 12 88 8200.
Chinese Offical Action (Sep. 2, 2016) from corresponding Chinese App. 2016083002538890.

\* cited by examiner

VEHICLE DRIVE TRAIN CONTROL METHOD

BACKGROUND AND SUMMARY

The invention relates to a hybrid propulsion system for a vehicle provided with combined mechanical and hydraulic propulsion. The invention is in particular directed to the hydraulic propulsion system of such a vehicle.

For heavy road vehicles, it is known that there is sometimes a desire for providing driving force on several wheel pairs such that the vehicle for example is provided with a driving force on a rear pair of wheels as well as on front pair of wheels. In many cases. It is desirable to be able to control the traction of the vehicle such that one or several wheel pairs may be connected or disconnected from the power source depending on the traction force demand. The propulsion unit may be the same for all the driving wheels or be a combination of different power sources, e.g. a vehicle provided with a mechanical drivetrain connected to an internal combustion engine and a hydraulic power source connected to hydraulic motors. In general, the mechanical drive is used as the main propulsion system for road travel and the hydraulic drive used as an auxiliary drive for rough conditions at low speeds or for a vehicle in a work mode, e.g. when using creep drive for loading or unloading operations. Different examples of such vehicles are for example disclosed in WO 2011/100 206; U.S. Pat. No. 5,361,208; U.S. Pat. No. 3,780,820; EP 505 727; or US 2011/197 574.

Vehicles today are thus provided with traction forces on both rear wheels and front wheels using a combined mechanical and hydraulic drive and are designed and have control systems for enabling, disabling and controlling the different traction systems to be used efficiently. However, there is still a desire to improve the systems in order to improve drivability and provide an efficient hydraulic drive system when using both propulsion systems as well as when using only one of the systems.

It is desirable to provide an efficient hydraulic propulsion system which may be used as an additional propulsion system together with a mechanical propulsion system to power wheels of the vehicle and in an easy way be activated or deactivated depending on the traction demand. In general the hydraulic propulsion system is intended to only be active during slow speeds, for example when there is a desire for additional power or used as the single traction source when performing, work or driving slowly with frequent stop and go. It is therefore a desire to be able to decouple or disconnect the hydraulic drive when using the vehicle at rather high speeds driving on a road only using a mechanical propulsion system. The hydraulic propulsion system should thus be possible to disconnect and connect in an easy way and be able to provide an efficient freewheeling with low frictional losses and low energy consumption during freewheeling, i.e. when the hydraulic propulsion system is not used for providing a traction force to the vehicle. Hence, the invention relates, according to an aspect thereof, to a heavy road vehicle comprising a hybrid propulsion system including at least a first traction wheel, preferably a pair of traction wheels, which forms a first mechanical propulsion system comprising a mechanical drive train including an internal combustion engine provides a traction force to the first traction wheel, or wheel pairs, via a gearbox. The hybrid propulsion system further comprises a second, different traction wheel, or preferably a second pair of traction wheels different from the first wheel pairs, which forms part of a second hydraulic propulsion system comprising a hydraulic pump unit powering at least one hydraulic motor in order to provide a traction force to said second traction wheel or wheel pairs. The hybrid propulsion system also comprises a control unit for control of said second, hydraulic propulsion unit. The control unit may also be connected to and able to control the first, mechanical propulsion system.

According to the present idea is the hydraulic propulsion system of the heavy vehicle connected to a pressure accumulator. The pressure accumulator enables the hydraulic propulsion system to be pressurized without the need to continuously use a hydraulic pump, a feature which may be useful for example during freewheeling of the hydraulically powered wheels.

Hence, the pressure accumulator is connected to the hydraulic motor or motors in order to maintain a pressure in the hydraulic motor. The pressure accumulator may thus be used instead of the pump unit for maintaining the pressure in a closed part of the hydraulic system including the motor or motors instead of providing a continuous flow of hydraulic liquid, by using the pump unit. The use of the pump unit is necessary when there is a desire to provide a continuous flow through the motors, e.g. when using the hydraulic system to provide traction power. The need for a pressurized system when not using the hydraulically powered wheels for traction, e.g., during freewheeling, is to assure there is hydraulic liquid present in the system for lubricating purposes, to be able to quickly switch on the hydraulic drive and the pressure may also be used to keep the hydraulically driven wheels in a freewheeling mode.

The pump may be constructed to be able to provide high pressure flow as well as low pressure flow. The pump unit may be designed to comprise a main pump for delivering a high pressure flow and a charge pump for delivering a low pressure flow. If the main pump is a variable displacement pump it may be able to provide a high pressure flow as well as a low pressure flow. The high pressure flow is used when there is a need or desire for providing a tractive force from the hydraulically driven wheel or wheel pairs. The charge pump is used either for supplying hydraulic liquid to the main pump or for being connected directly to the hydraulic propulsion system and used for providing a low pressure flow through the hydraulic motor, e.g. if there is a desire to provide a cooling flow to the hydraulic motor without any significant traction desired. The charge pump could be of the fixed displacement kind or variable displacement. The hydraulic motors could advantageously be of the fixed displacement kind even though a variable displacement also is possible.

The pressure accumulator may be connected to the pump unit to be pressurized by the pump unit hi order to achieve a high pressure in the pressure accumulator the pressure accumulator is pressurized or loaded by a flow from the main pump of the pump unit.

In order to control the hydraulic propulsion system, it is provided with a number of valves which may stop or control the flow direction of the hydraulic liquid. It is obvious for the skilled person in the art that the valves and hydraulic piping forming the hydraulic system may be designed in an almost endless way of combinations such that the hydraulic propulsion system may be controlled to switch between a first pressure accumulator mode in which the hydraulic motor may be pressurized by the pressure accumulator while there is essentially no flow through the motor and a second pump pressure mode in which there is a flow from the pump unit through the hydraulic motor. In order to work properly, the hydraulic system should be designed such that it is possible to charge the pressure accumulator, preferably from the pump unit used for providing a tractive flow to the hydraulic motor. The pressure accumulator should also be able to be in hydraulic communication with the hydraulic motor when the pump unit is switched off or at idle such that the pressure in the motor is maintained. When the pressure accumulator is used for pressurizing the hydraulic motor it should be possible to cut off the flow through the hydraulic motor in order to maintain the pressure within the motor. There are thus a number of ways to design the system to be able to fulfill these desired criteria which are within the scope of the invention. The hydraulic system may be realized by having a flow directional valve which enables a flow from the pump unit through the hydraulic motor or motors when the hydraulic drive is turned on while enabling the pressure accumulator to be loaded at the same time. If the pressure accumulator is loaded above a certain pressure, the flow to the pressure accumulator may be cut off and the hydraulic drive may continue. When it is desired that the hydraulic drive no longer shall be used, the hydraulic pumps may be turned off and the pressure accumulator and the hydraulic motor (s) may be set in hydraulic connection with each other within a closed part of the hydraulic system such that the pressure in the hydraulic motors is maintained while there is no flow through the system.

The invention further relates to a Method for controlling a propulsion system comprising a first traction wheel forming part of a first propulsion system comprising a mechanical drive train including an internal combustion engine which provides a traction force to said first traction wheel via a gearbox and a second traction wheel forming part of a second propulsion system comprising a hydraulic pump unit for powering a hydraulic motor in order to provide a traction force to said second traction wheel. Said hybrid traction system further comprises a control unit for controlling said second propulsion unit (13). The control unit is programmed to switch of or set said hydraulic pump unit in an idle mode when it is indicated that a hydraulic pressure accumulator connected to the hydraulic propulsion system has a pressure above a defined pressure limit while at the same time there is indicated there is no desire for a flow of hydraulic liquid from the pump unit to the hydraulic motor. The hydraulic propulsion system is thereby controlled such that the pressure accumulator is connected to the hydraulic motor in order to maintain a pressure in the hydraulic motor.

The control system is in particular suitable for a heavy vehicle of a heavy load carrying kind. The system is particularly useful for trucks which in their duty frequently are used in rough conditions, e.g. timber loading trucks which may be used on small provisional roads or tracks in the forest where the path may be loose or muddy and additional traction force is desired. The vehicle may also be another kind of heavy road vehicle which frequently starts and stops during its working time, e.g. a public bus used at least occasionally in city traffic. Hence, the mechanical/hydraulic hybrid drive system is suitable for vehicles to be used as goods or passenger carriers which demands to provide a comfortable and efficient propulsion when traveling at creep speed, e.g. in a frequently "stop and go"-situation as well as when traveling at higher speeds over longer distances. In order to provide the desired traction under circumstances with poor traction conditions shall both systems also be possible to use simultaneously.

A heavy vehicle of the kind described above shall thus preferably be adapted to run smoothly on normal roads at a relatively high velocity, e.g. up to 90 km/h, while also assure traction at low speeds on unpaved, provisional roads. In order to function in a desirable way under different conditions as exemplified above, the complementary drive, i.e. the hydraulically propelled front wheels, shall be able to be disconnected when driving at high speeds and being able to provide an additional traction force when desired, normally at relatively low speeds. In general, there is no need for using the complementary hydraulic propulsion units above 30 km/h even though it may be advantageous to use them sometimes up to 50 km/h. The vehicle may also be provided with a creep drive function at low velocities when only the hydraulic drive is used.

In order to function efficient for the above described conditions it is thus desired to provide a hydraulic propulsion system which in an efficient way is disconnected and while disconnected reduces the energy consumption. This may be achieved by using the pressure accumulator in order to maintain a desired pressure in the hydraulic system without the need for a continuously working pump. In order to be able to turn off the pump for a longer time is the main flow preferably cut off such that a static pressure in the system is maintained. In some cases it may be desired to have a small leakage flow from the system in order to make the system work properly.

DETAILED DESCRIPTION

Figure 1:
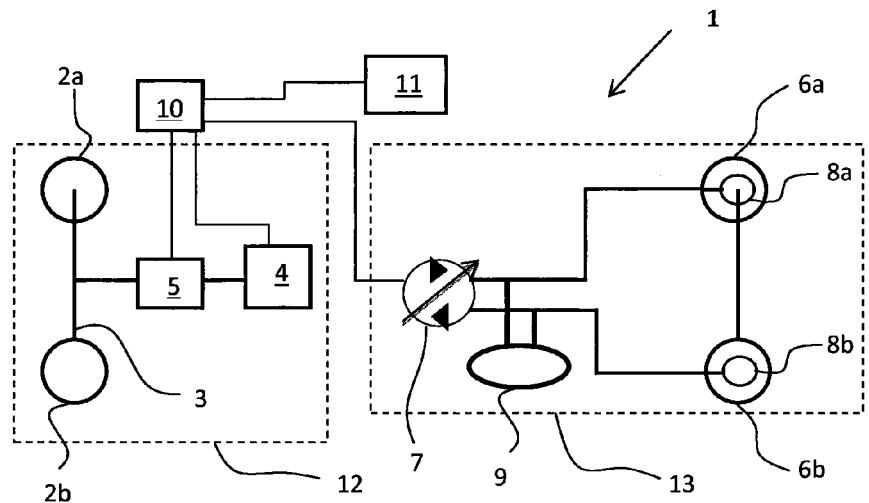
FIG. 1. Describes a schematic view of a heavy load carrying vehicle provided with an auxiliary hydraulic traction on the front wheels FIG. 2 Describes a hydraulic propulsion system according to an embodiment of the invention FIG. 3 Describes a schematic figure of an axial cross sectional view of a hydraulic motor

In FIG. 1 is shown a schematic view of a propulsion system 1 for a heavy road vehicle. The propulsion system 1 comprises a first mechanical propulsion system 12 and a second hydraulic propulsion system 13. The first mechanical propulsion system 12 comprises a pair of traction wheels 2a, 2b which are located on a rear, driven axle 3 which is powered by an internal combustion engine (ICE) 4. The rear, driven axle 3 is connected to the ICE 4 via a gearbox 5. The gear box 5 may be a stepped gear box and the mechanical drive train may comprise a Double Clutch Transmission (DCT) in order to reduce the time for a change of gear. The second, hydraulic propulsion system 13 further comprises a second pair of traction wheels 6a, 6b, the from wheels, which are driven by a pair of hydraulic motors 8a, 8b which are connected to and powered by a hydraulic pump unit 7. An example of suitable hydraulic motors is described in FIG. 3. The hydraulic propulsion system 13 further comprises a pressure accumulator 9 connected to the hydraulic motors 8a, 8b. In order to be able to control the hydraulic flow as desired there is of course different valves, e.g. flow direction valves and cut off valves, present the hydraulic propulsion system 13. A hydraulic propulsion system 13 suitable for the traction system 1 is described in FIG. 2.

The traction system 1 further comprises a control unit 10 which is connected to the ICE 4, the gear box 5 and the hydraulic pump unit 7. Even though it is not necessary for the control unit 10 to be connected to the ICE 4 and gear box 5, it is considered to be beneficial for providing a desired control of the hydraulic propulsion system 13. The control unit could of course also be connected to other parts of the propulsion systems 12, 13, e.g. it may be connected to the hydraulic motors 8a, 8b in order to send output signals to control valves in the motors 8a, 8b and the pressure accumulator 9.

The control unit may be connected to a variety of sensors, e.g. speed sensors for indicating the speed of the front driven wheels 6a, 6b and the rear driven wheels 2a, 2b. Speed sensors may be useful for traction control when using both propulsion systems 12, 13 in rough conditions to avoid slip or spin. Speed sensors could be replaced for or used together with further sensors used for control of the propulsion units. The control unit 10 may further be connected to a traction regulator 11 which is used by the driver for selecting between different drive modes, e.g. hybrid drive (both mechanical and hydraulic propulsion systems used), normal drive (only mechanical propulsion used) and creep drive (only hydraulic propulsion used). It may also be possible to have an automatic or semi-automatic mode selection which selects suitable propulsion units to be used, e.g. only mechanical propulsion at velocities above a certain speed limit and activate the hydraulic propulsion automatically if it is detected a wheel slip or wheel spin.

It is of course possible to include further wheels to be driven by the mechanical or hydraulic, propulsion systems as well as non-driven wheels. Likewise, it is of course possible to change the propulsion such that the rear wheels 2a, 2b are driven by the hydraulic, propulsion system 13 and the front wheels 6a, 6b are driven by the mechanical propulsion system 12.

Figure 2A:
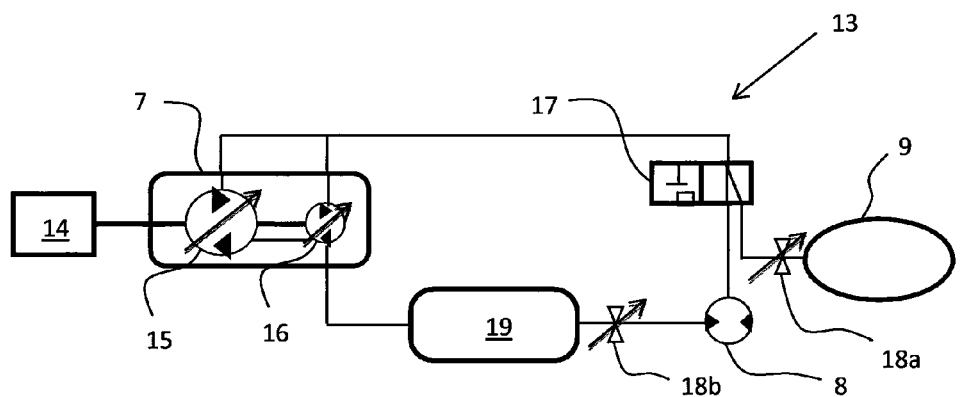

In FIGS. 2a and 2h is a more detailed hydraulic propulsion system 13 comprising a pump unit 7 connected to a hydraulic motor 8 and a pressure accumulator 9 via a two way flow guide valve 17. The pump unit 7 comprises a main pump 15 and a charge pump 16. The pumps 15, 16 are powered by a Power Take Off (PTO) 14. The charge pump 16 will provide a low pressure hydraulic liquid flow from a reservoir tank 19 to either be used to directly feed the hydraulic motor 8 or be used to provide a supply flow of hydraulic liquid to the main pump 15. The low pressure flow to the hydraulic motor 8 may be used when there is no desire to use the motor 8 for propulsion but it is desired to provide a flow through the hydraulic, motor 8 in order to cool the motor 8 when it is decoupled during, freewheeling. When the low pressure flow is directed to feed the main pump 15 is it intended to be used for producing a high pressure flow from the main pump 15 for powering, the hydraulic motor 8 when there is a desire to provide a hydraulic traction force. The high pressure flow from the main pump 15 is preferably also used to charge the pressure accumulator 9 even though it may also be possible to charge the pressure accumulator 9 with the low pressure flow from the charge pump 16. The pressure accumulator 9 may be connected via the two way flow direction valve 17 to the hydraulic motor 8 in order to maintain a pressure in the motor 8 when no flow is desired. From the hydraulic motor 8 there is a return flow of hydraulic liquid to the reservoir tank 20. The two way flow guide valve 17 is used to control the flow from the pump unit 7 to the hydraulic motor 8 and the pressure accumulator 9. There is further a first variable flow restriction valve 18a between the two way valve 17 and the pressure accumulator as well as a second variable flow restriction valve 18b between the hydraulic, motor 8 and the reservoir tank 19.

In FIG. 2a is the two way valve 17 set in a first, pump flow, position in which the flow from the pump unit is directed to the pressure accumulator 9 and the hydraulic motor 8. In this position may thus the pressure accumulator 9 be loaded or pressurized while there also may be a flow through the hydraulic motor 8. When the pressure in the pressure accumulator 9 has reached a desired level may the first variable flow restriction valve 18a between the pressure accumulator 9 and the two way valve 17 be closed and the pressure in the pressure accumulator 9 kept at the desired pressure. The pump unit 7 may continuously provide a high pressure flow, using the main pump 15, or low pressure flow, using the charge pump 16, to the hydraulic motor 8 when the two way flow direction valve 17 is in this position. When the pump unit 7 is used to produce a flow through the hydraulic motor 8 is the second switch oft valve between the hydraulic motor 8 and the reservoir tank 19 open.

Figure 2B:
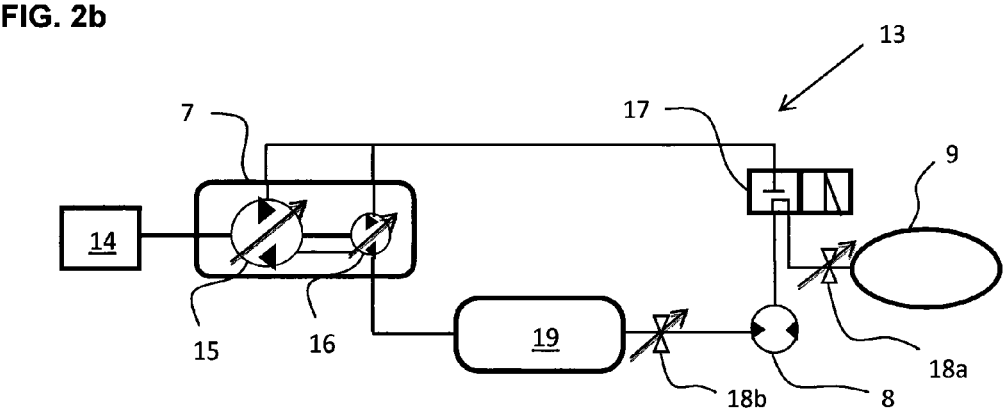

In FIG. 2b is the two way valve 17 set in a second, accumulator pressure, position in which the pressure accumulator 9 is connected to the hydraulic motor 8 to maintain a pressure in the hydraulic motor 8. When the two way valve 17 is set in this second position is the first flow restriction valve 18a between the pressure accumulator 9 and the two way valve 17 kept open while the second variable flow restriction valve 18b between the hydraulic, motor 8 and the reservoir tank 20 kept closed or possibly slightly open to allow a small "leakage" flow. When the two way valve 17 is set in this second accumulator pressure position is the flow from the pump unit 7 to the hydraulic motor cut off. Hence, the pump unit 7 should not provide any flow when the two way valve is set in this position and the pump unit 7 may be switched offer set at idle, e.g. by setting a variable displacement pump to provide zero flow, such that energy may be saved. If the pressure in the hydraulic motor 8 drops below a predefined value, the two way valve 17 may switch from the second, accumulator pressure, position to the first, pump flow, position while maintaining the first flow restriction valve 18a between the two way valve 17 and the pressure accumulator 9 open and the second flow restriction valve 18b between the hydraulic motor 8 and the reservoir tank 20 closed while the pump unit 7 is activated to pressurize the pressure accumulator 9 and the hydraulic motor 8. When the pressure in the accumulator 9, and thus also the hydraulic, motor 8, has reached a desired level may the two way valve 17 shift over to the second, pressure accumulator, position and the pump unit 7 may once more be switched off or set at idle.

Figure 3:
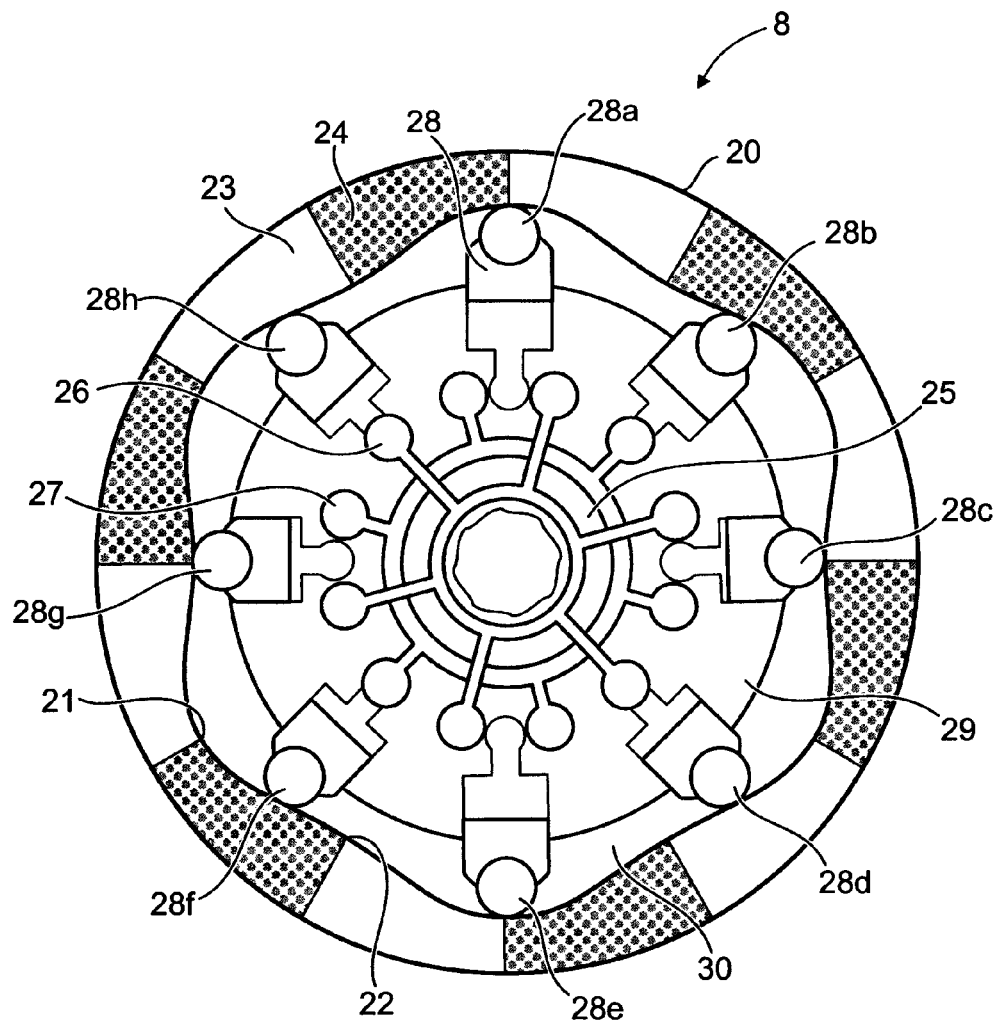

In FIG. 3 is shown a schematic figure of art axial cross sectional view of a hydraulic motor 8, 8a, 8b suitable for the system disclosed in FIGS. 1 and 2 The hydraulic motor 8, 8a, 8b comprises an outer cam ring 20 having an essentially hexagonal shape provided with rounded edges 21 and rounded, inwardly raised portions 22 in between the edges 21. The cam ring 20 is rotating with a wheel connected to the hydraulic motor 8. The cam ring 20 is further divided in direction fields 23, 24 which are defined by the peak of the raised portions 22 and the edges 21. A direction field 23 which extends from an edge 21 to a peak of the raised portion 22 in the clockwise direction corresponds to a clockwise rotational field 23 and such a field 23 will be thus be referred to as a forward rotational field hereinafter. A direction field 24 which extends from an edge 21 to a peak of the raised portion 22 in the counterclockwise direction corresponds to a counterclockwise rotational field 24 and such a field will thus be referred to as a reverse rotational field 24 hereinafter. The hydraulic motor further includes a central distributor plate 25 also rotating with the wheel and provided with forward channels 26 and reverse channels 27. The channels 26, 27 have six openings each which are adapted to fit in and connect hydraulically with hydraulic pistons 28, in this case eight pistons, which are located symmetrically around the rotational centre of the motor 8 on a fixed cylinder block 29. The forward and reverse channels 26, 27 are designed such that the forward channels 26 are located in the same circle sectors as the forward rotational fields 23 of the cam ring 20 and the reverse channels 27 are located in the came circle sectors as the reverse rotational fields 24 for delivering hydraulic liquid to the pistons 28. When either the forward channel 26 or the reverse channel 27 is pressurized, the camring 20 and a wheel attached thereto will move correspondingly to provide a forward motion or a reverse motion of a vehicle. In the figure, it is shown that two pistons 28 d, h (upper left and lower right pistons) are fitted with and hydraulically connected with openings of the forward channel 26 and ready to receive pressurized hydraulic liquid from the hydraulic system. If the hydraulic, liquid, in the forward channel 26 is pressurized, the upper left piston 28g and the lower right piston 28d will be pushed outwards and cause a clockwise (forward) motion of the cam dug 20 and a wheel attached to the cam ring 20. As the cam ring 20 and the distributor plate 25 rotates, the connection between the pressurized pistons 28d, g (upper left and lower right pistons) will be disconnected and depressurized such that the pistons 28 d, h may easily be returned into the fixed cylinder block 29. While the cam ring 20 is moving in the forward direction, the left piston 28f and right piston 28c will become hydraulically connected to the forward channel 26 and these pistons 28c, f will be pushed outwards and provide for a continuing forward motion of the camring 20. This procedure will thus continue for the cylinders 28 until the forward channel 26 is depressurized. If a reverse motion is desired instead, the reverse channel 27 is pressurized instead and a reverse motion of the cam ring 20 and an attached wheel is achieved. In order to decouple the hydraulic engine, the space between the earn ring 20 and the cylinder block 29, usually the space in the hydraulic motor defined by a motor housing, could be pressurized such that the pistons will be pushed into the cylinder block 29 and a wheel connected to the hydraulic motor 8 may rotate more or less freely. This space may thus be pressurized either by using the pump unit 7 or the pressure accumulator 9 (see FIGS. 1 and 2). Hence, the hydraulic motors may be decoupled in an efficient way such that there are small losses due to additional friction from the hydraulic motor when decoupled. Since the hydraulic engines usually not are intended to be used for propulsion of the load carrying truck when travelling above 30 km/h on a road or highway, it is important that the mounting of the hydraulic motors to the vehicle not will contribute with a significant additional rolling resistance when decoupled.

Even though it is exemplified above to have six cams on the cam ring, the number of cams could be different, e.g. 9 or 10. Likewise, the number of pistons needs not to be 8 but could be 10 or 12 for example.

The invention claimed is:

1. A heavy road vehicle comprising a hybrid propulsion system, system comprising
    a first traction wheel forming part of a first propulsion system comprising a mechanical drive train including an internal combustion engine which provides a traction force to the first traction wheel via a gearbox,
    a second traction wheel forming part of a second propulsion system comprising a hydraulic pump unit for powering a hydraulic motor in order to provide a traction force to the second traction wheel,
    a control unit for controlling the second propulsion system,
    a hydraulic pressure accumulator which is connected to the second propulsion system, the pressure accumulator being connected to the hydraulic motor in order to maintain a pressure in the hydraulic motor,
    wherein the pump unit comprises a main pump, delivering a high pressure flow, and a charge pump, delivering a low pressure flow.

2. A heavy road vehicle according to claim 1, wherein the pump unit comprises a main pump having a variable displacement for delivering a high pressure liquid.

3. A heavy road vehicle according to claim 1, wherein the pressure accumulator is connected to the pump unit and is pressurized by the pump unit.

4. A heavy road vehicle according to claim 1, wherein the second propulsion system is provided with valves which may be controlled such that the second propulsion system may switch between a first pressure accumulator mode in which the hydraulic motor may be pressurized by the pressure accumulator while there is essentially no flow through the motor and a second pump pressure mode in which there is a flow from the pump unit through the hydraulic motor.

5. A heavy road vehicle according to claim 1, wherein the pump unit is designed to be able to deliver a low pressure from the charge pump to the hydraulic motor if there is a need for low pressure flow through the hydraulic motor in order to cool the hydraulic motor.

6. A method for controlling a hybrid propulsion system for a heavy road vehicle, the hybrid propulsion system comprising
    a first traction wheel forming part of a first propulsion system comprising a mechanical drive train including an internal combustion engine which provides a traction force to the first traction wheel via a gearbox,
    a second traction wheel forming part of a second propulsion system comprising a hydraulic pump unit for powering a hydraulic motor in order to provide a traction force to the second traction wheel,
    a control unit for controlling the second propulsion system,
comprising
    switching off the hydraulic pump unit or setting the hydraulic pump unit in an idle mode when it is indicated that a hydraulic pressure accumulator, which is connected to the second propulsion system, has a pressure above a defined pressure limit and there is indicated there is no desire for a flow of hydraulic liquid from the pump unit to hydraulic motor whereby the pressure accumulator is connected to the hydraulic motor in order to maintain a pressure in the hydraulic motor.

* * * * *